United States Patent Office 2,831,880
Patented Apr. 22, 1958

2,831,880

ORGANOSILICON DERIVATIVES OF DICYCLOPENTADIENYL METALS AND METHODS FOR PREPARING THE SAME

Robert A. Benkeser, Lafayette, Ind., assignor to General Electric Company, a corporation of New York No Drawing. Application January 3, 1955
Serial No. 479,669

11 Claims. (Cl. 260—439)

This invention is concerned with novel compositions of matter and methods for preparing the same. More particularly, the invention relates to organosilicon-substituted dicyclopentadienyl metals having the general formula (I)
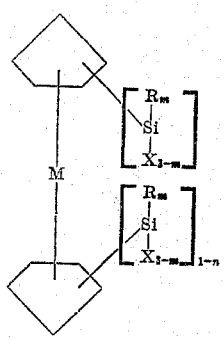

where R is a monovalent organic radical, for instance a monovalent hydrocarbon radical, X is a halogen (e. g., chlorine, bromine, fluorine, etc.), M is a metal selected from the class consisting of iron and nickel, $m$ is a whole number equal to from 1 to 3, inclusive, and $n$ is a whole number equal to from zero to 1.

Metallic derivatives of cyclopentadiene have been disclosed in the prior art. Thus, U. S. Patent 2,680,756, issued June 8, 1954, discloses dicyclopentadienyl iron and U. S. Patent 2,680,758 discloses dicyclopentadienyl nickel. However, other than the fact that a carboxyl group has been attached to a dicyclopentadienyl iron compound, no other modifications of this organo-metallic molecule have been reported which would yield useful compositions. Because of the lack of functional groups on the dicyclopentadienyl metal, it has been difficult to make derivatives of these materials and thus the utility for these dicyclopentadienyl metals has been extremely limited.

I have now discovered that I am able to prepare organosilicon derivatives of dicyclopentadienyl metals whereby I am able to attach from 1 to 2 organosilicon radicals of the formula (II)

where R, X and $m$ have the meanings given above. By means of these groups, it is possible to modify the properties of the dicyclopentadienyl metal whereby they can be employed in a wider range of application, and also to obtain derivatives which can be further processed, either by themselves or with other compositions, to give novel compositions of matter.

For brevity, the dicyclopentadienyl molecule will be referred to wherever formulas are required as follows:

(III)
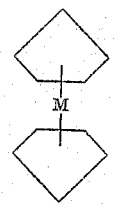

where M is a metal selected from the class consisting of iron and nickel, Formula III being the simplest representation of the cyclopentadienyl metal radical. The exact means and points of attachment of the metal to the cyclopentadienyl atoms is presently not exactly known. A more specific dicyclopentadienyl metal is shown below (IV)
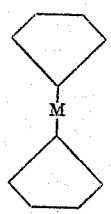

where the metal is attached to the same point in each cyclopentadienyl group. However, it should be understood that the invention is intended to cover attachment of the metal atom to any carbon atom of each cyclopentadienyl grouping, and that the attachment of the metal atom to a cyclopentadienyl grouping may be the same as in the other cyclopentadienyl grouping, or to a different point in the cyclopentadienyl grouping. It is difficult to determine at which point of the cyclopentadienyl residue the metal is attached, because of the various reactive positions. Accordingly, for future discussion, when referring to the cyclopentadienyl iron or the dicyclopentadienyl nickel, which have, respectively, the formulas (V)
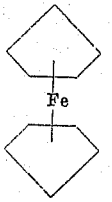

and (VI)
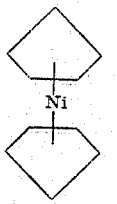

no attempt will be made to identify the position of attachment of the metal ions to the cyclopentadienyl residues.

In preparing the compositions described and claimed in the present application, the initial reactants require the preparation of dicyclopentadienyl iron and dicyclopentadienyl nickel. The preparation of dicyclopentadienyl iron is described in U. S. Patent 2,680,756 and the preparation of the dicyclopentadienyl nickel is described in U. S. Patent 2,580,758.

The preparation of the organosilicon-substituted derivatives of the dicyclopentadienyl iron and dicyclopentadienyl nickel may be varied widely but preferably is as follows, taking as a convenient example of the dicyclopentadienyl metal the compound, dicyclopentadienyl iron, it being understood that the derivatives of the dicyclopentadienyl nickel can be prepared in the same manner. For brevity, the dicyclopentadienyl iron hereinafter will be referred to as "ferrocene." An alkyl (e. g., ethyl, propyl, isobutyl, n-butyl, amyl, etc.) lithium is used to metallate the ferrocene to yield a mixture of the mono-substituted and di-substituted derivative, i. e., the mono-metallated and the di-metallated derivative in which usually the amount of monometallated derivative predominates. As an example of the alkyllithium, I have found that n-butyllithium is advantageously employed. The molar concentrations of the alkyllithium may be varied widely and may range from about 1 to 2 or more mols of the butyllithium per mol of the ferrocene, depending on the number of lithium groups it is desired to insert on the ferrocene molecule. This reaction is advantageously carried out by dissolving the ferrocene in a solvent therefor, for instance anhydrous diethyl ether, and adding the alkyllithium and allowing it to react preferably at around 25° to 35° C. in an inert atmosphere for periods ranging from about 5 to 40 hours or more.

The metallated ferrocene is thereafter reacted under anhydrous conditions with a halogenosilane of the formula (VII)     $R_mSiX_{4-m}$ where R and X have the meaning given above, and $m$ is a whole number equal to from 1 to 3, inclusive. This reaction is advantageously carried out by further diluting the above-described ether solution of the metallated ferrocene with an additional amount of an ether, for instance diethyl ether, and thereafter adding the halogenosilane described above, and permitting the mixture, preferably to reflux at atmospheric pressure for varying lengths of time, for instance from about 1 to 12 hours or more, with stirring. The organosilicon derivative of the ferrocene is thereafter isolated by usual processing including distillation and recrystallization from solvents for the product, as for instance benzene, to give usually both the di-substituted derivative and the mono-substituted derivative.

The amount of halogenosilane employed with the metallated ferrocene compound (which is intended to means the lithium derivative) may obviously be varied widely, depending upon the number of lithium groups on the cyclopentadienyl residues, and the type of halogenosilane used. If there is one lithium atom attached to each cyclopentadienyl residue of the ferrocene, and the halogenosilane only has one halogen attached to silicon, for instance, trimethylchlorosilane or triphenylchlorosilane, and it is desired to substitute two of the organosilane residues, for each mol of the dimetallated dicyclopentadienyl iron, one will use at least two or more mols of the halogenosilane. If one is working, for instance, with diphenyldichlorosilane or dimethyldichlorosilane, and one wishes to have as a residue an organosilicon grouping containing silicon-bonded halogen, for example silicon-bonded chlorine, one will employ the same molar ratios as when working with the triphenylchlorosilane. However, it will be apparent from the description of the invention that if one is working, for instance, with the dimetallated (i. e., one lithium atom on each cyclopentadienyl residue) dicyclopentadienyl iron, and with, for instance, phenyltrichlorosilane, and one employs at least two mols of the phenyltrichlorosilane per mol of the metallated ferrocene, one can also obtain two molecules containing the ferrocene nucleus joined to each other through a silicon atom and having the formula (VIII) 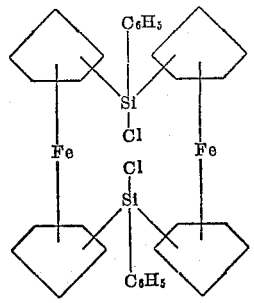

Under similar circumstances, it is possible to have when working with, for instance, diphenyldichlorosilane, compositions of the formula (IX) 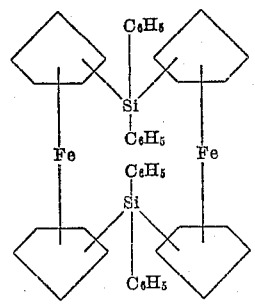

It will of course be apparent to those skilled in the art that the above general description of preparing the compositions herein described and claimed applies equally as well to making derivatives of dicyclopentadienyl nickel and to organosilicon derivatives of metallated dicyclopentadienyl iron and dicyclopentadienyl nickel wherein other organic groups and halogens may be attached to the silicon of the organohalogenosilane. In this respect, it will be apparent that R in all the foregoing formulas may be any inert organic radical and particularly the same or different monovalent radical, as for instance alkyl radicals (e. g. methyl, ethyl, propyl, isopropyl, butyl, decyl, etc.), aryl radicals (e. g., phenyl, napthyl, biphenyl, etc.), aralkyl radicals (e. g., tolyl, xlyl, ethylbiphenyl, etc.), aralkyl radicals (e. g., tolyl, xylyl, ethylcyclopentane, cyclohexene, etc.), alkenyl radicals (e. g., vinyl, allyl, methallyl, etc.), as well as monovalent hydrocarbon radicals containing substituents thereon which are inert (for instance, halogen, such as chlorine, bromine, fluorine, etc.).

In order that those skilled in the art may better understand how the present invention may be practiced, the following examples are given by way of illustration and not by way of limitation. All parts are by weight.

*Example 1*

A solution of 10 grams (0.054 mol) of ferrocene [which can be prepared in accordance with U. S. Patent 2,680,756 or as is described in J. A. C. S. 74, page 2125 (1952) by G. Wilkinson et al.] in 225 ml. of anhydrous diethyl ether was placed in a three-necked flask fitted with a dropping funnel and a Friedrichs condenser. To this was added 0.108 mol butyllithium [prepared in accordance with the disclosures in Woodward et al. article J. A. C. S. 74, page 3458 (1952)], and the mixture was stirred for 37 hours in an atmosphere of nitrogen. The reaction product was then further diluted with 200 ml. anhydrous diethyl ether, and thereafter 35.3 grams (0.108 mol) triphenylchlorosilane was added. The mixture was heated at the reflux temperature of the mass for about three hours, stirred an additional nine hours, and thereafter hydrolyzed by pouring it into about 300 ml. water to give a two-phase system. The precipitate which was thus obtained was recrystallized from benzene to give 2.5 grams of bistriphenylsilyl ferrocene having the formula (X)
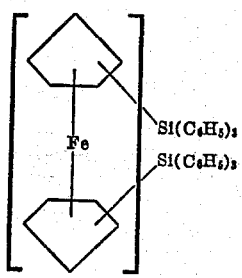

This material was found to have a melting point of 253–254° C. Analysis of the compound showed it to contain 75.59% carbon and 5.71% hydrogen (calculated 75.68% carbon and 5.44% hydrogen). The ether layer of the above-mentioned filtrate was separated and evaporated to give an oil which was steam distilled to remove unreacted ferrocene. The pot residue was taken up in benzene and dried. A solid was obtained upon evaporation of the benzene. This solid was recrystallized from petroleum ether (boiling point 90–100° C.) to yield 6.5 grams of triphenylsilyl ferrocene melting at about 142–143° C. and having the formula (XI)
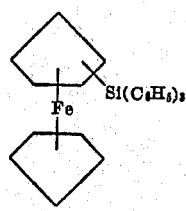

Analysis of this compound showed it to contain 79.01% carbon and 5.75% hydrogen (calculated 78.62% carbon and 5.45% hydrogen).

*Example 2*

The mono-substituted and di-substituted triphenylsilyl derivative of dicyclopentadienyl nickel having the formulas (XII)
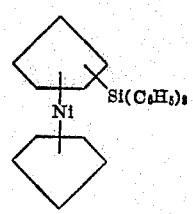

and
(XIII)
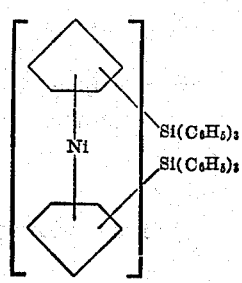

may be prepared identically as described in Example 1 with the exception that one employs dicyclopentadienyl nickel in place of the dicyclopentadienyl iron used in Example 1. The dicyclopentadienyl nickel may be obtained in accordance with the directions found in U. S. Patent 2,680,758 issued June 8, 1954.

*Example 3*

The mono-substituted and di-substituted trimethylsilyl ferrocene having, respectively, the formulas (XIV)
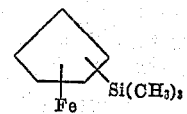

and
(XV)
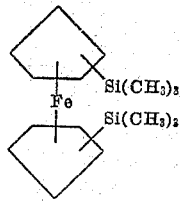

may be obtained in the same manner as described in Example 1 with the exception that an equivalent amount of trimethylchlorosilane is used in place of the triphenylchlorosilane employed in Example 1.

*Example 4*

The compounds diphenylchlorosilyl ferrocene and bis-(diphenylchlorosilyl) ferrocene have the formulas respectively (XVI)
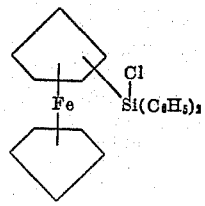

and
(XVII)
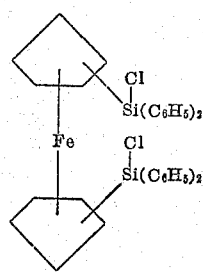

may be obtained similarly as described in Example 1 but instead employing in place of the triphenylchlorosilane of Example 1, diphenyldichlorosilane in essentially the same molar ratio. The use of water should be avoided to prevent hydrolysis of the silicon-bonded chlorine, but instead fractional distillation under reduced pressure should be employed to remove the desired products leaving behind the non-volatile lithium chloride.

*Example 5*

The compound bis-(methyldichlorosilyl) ferrocene having the formula (XVIII)
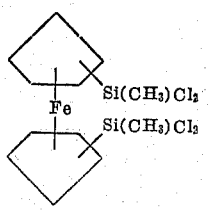

can be obtained similarly as in Examples 1 and 4 with the exception that in place of the triphenylchlorosilane or diphenyldichlorosilane, one employs equivalent molar concentrations of methyltrichlorosilane. Obviously, there will also be present the mono-substituted methyldichlorosilyl derivative of the ferrocene in addition to reaction products where two of the ferrocene molecules are connected to each other through a silicon linkage, as for instance those having the formula (XIX)

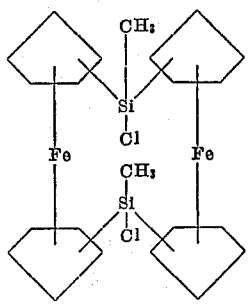

It will of course be apparent to those skilled in the art that other compositions coming within the scope of Formula I, where R and X may have various meanings as more particularly recited above, can be obtained in accordance with the above procedures. Also, it will be apparent that different molar concentrations will yield different reaction products, such as the mono-substituted organosilane derivative or di-substituted organosilane derivative. The presence of silicon-bonded halogen in the final products will depend upon the starting organohalogenosilane and the number of dicyclopentadienyl iron or nickel molecules which react. In place of the dicyclopentadienyl iron ingredient, one obviously can also use the dicyclopentadienyl nickel derivative.

The above-described organosilicon-substituted derivatives of dicyclopentadienyl iron and dicyclopentadienyl nickel which do not contain silicon-bonded halogen can be used in various applications. Among such may be mentioned as anti-oxidants, as catalysts for various reactions such as those involving carbon monoxide, as a source of free radicals, and as an organic carrier of iron in high concentration. The organo-silicon derivatives of dicyclopentadienyl nickel should be effective as antiknock agents in fuels for spark ignition engines.

The organosilyl derivatives of the dicyclopentadienyl iron and dicyclopentadienyl nickel in which the silicon atoms contain silicon-bonded halogens can be hydrolyzed by themselves to give polysiloxane compositions which can be useful as lubricants in high temperature applications, or can be used for interaction with other organohalogenosilanes as, for instance, in the cohydrolysis with dimethyldichlorosilane to make chain-stopped organopolysiloxanes having utility in the lubricating and hydraulic fluid arts. Thus, taking as an example the compound having Formula XVII, this compound can be cohydrolyzed with dimethyldichlorosilane to form organopolysiloxanes of the general composition (XX)

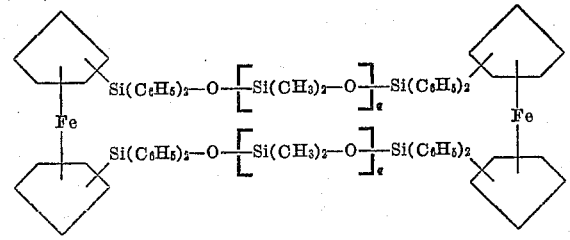

where $q$ is an integer equal to at least 1 or higher, for instance as high as 10 to 50 or more. Such compositions can be employed as lubricants, and can be used as anti-foam agents whereby small amounts thereof may be added to organic materials which usually foam to reduce the tendency of these organic materials to foaming. Where there is a single organohalogenosilane substituted on the dicyclopentadienyl metal, it will be apparent that compositions of this sort when cohydrolyzed with for instance dimethyldichlorosilane can yield materials having the formula (XXI)

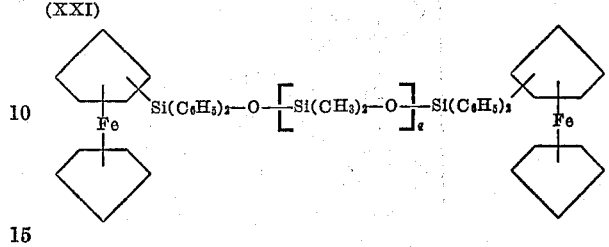

where $q$ has the meaning above. These materials will have good temperature resistance and can be used as lubricants.

What I claim as new and desire to secure by Letters Patent of the United States is:

1. A composition of matter corresponding to the general formula $$M\begin{bmatrix}R_m\\Si\\X_{3-m}\end{bmatrix}\begin{bmatrix}R_m\\Si\\X_{3-m}\end{bmatrix}_{1-n}$$

where R is a monovalent hydrocarbon radical selected from the class consisting of alkyl, aryl, aralkyl, cycloaliphatic and alkenyl radicals, and halogen-substituted derivatives of the aforesaid class of radicals, X is a halogen, M is a metal selected from the class consisting of iron and nickel, $m$ is a whole number equal to from 1 to 3 and $n$ is a whole number equal to from 0 to 1.

2. Triphenylsilyl ferrocene having the formula

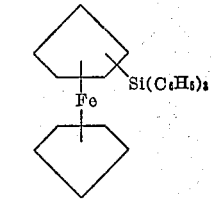

3. Bis-(triphenylsilyl) ferrocene having the formula

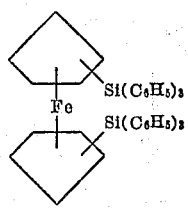

4. Bis-(trimethylsilyl) ferrocene having the formula

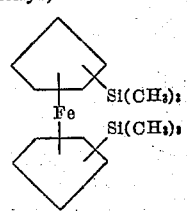

5. Bis-(triphenylsilyl) dicyclopentadienyl nickel having the formula

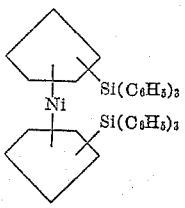

6. Bis-(diphenylchlorosilyl) ferrocene having the formula

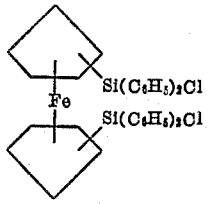

7. The process of making organosilicon derivatives of a dicyclopentadienyl metal in which the metal is selected from a class consisting of iron and nickel, which process comprises reacting a dicyclopentadienyl metal of the formula

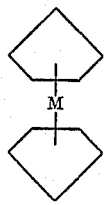

where M is a metal selected from the class consisting of iron and nickel, with an alkyllithium, thereby to attach a lithium atom to a cyclopentadienyl residue, and thereafter effecting reaction in the presence of heat of the lithium derivative of the dicyclopentadienyl metal with a compound having the formula $$R_mSiX_{4-m}$$

where R is a monovalent hydrocarbon radical selected from the class consisting of alkyl, aryl, aralkyl, cycloaliphatic and alkenyl radicals, and halogen-substituted derivatives of the aforesaid class of radicals, X is a halogen, and $m$ is a whole number equal to from 1 to 3, inclusive, thereby to obtain a compound corresponding to the general formula

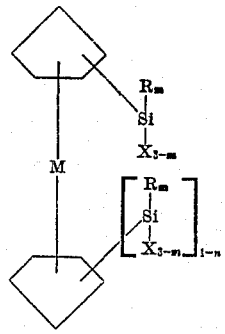

where R, X, M and $m$ have the meaning given above, and $n$ is a whole number equal to from 0 to 1.

8. The process as in claim 7 in which the alkyllithium is n-butyllithium.

9. The process as in claim 7 in which the organohalogenosilane is triphenylchlorosilane.

10. The process as in claim 7 in which the organohalogenosilane is trimethylchlorosilane.

11. The process as in claim 7 in which the organohalogenosilane is diphenyldichlorosilane.

References Cited in the file of this patent

Benkeser et al.: Jour. Amer. Chem. Soc., vol. 76, pages 4025, 4026 (August 5, 1954).